United States Patent [19]

Skrgatic

[11] Patent Number: 4,580,448

[45] Date of Patent: Apr. 8, 1986

[54] METHOD AND APPARATUS FOR ULTRASONIC MEASUREMENT OF A PHYSICAL PARAMETER

[75] Inventor: Damir M. J. Skrgatic, Edinburgh, United Kingdom

[73] Assignee: Acumet Precision Instruments, Ltd., Edinburgh, Scotland

[21] Appl. No.: 611,039

[22] PCT Filed: Sep. 15, 1983

[86] PCT No.: PCT/GB83/00226

§ 371 Date: May 15, 1984

§ 102(e) Date: May 15, 1984

[87] PCT Pub. No.: WO84/01233

PCT Pub. Date: Mar. 29, 1984

[30] Foreign Application Priority Data

Sep. 15, 1982 [GB] United Kingdom ............... 8226306

[51] Int. Cl.[4] ............................................. G01F 23/28
[52] U.S. Cl. ................................... 73/290 V; 367/908
[58] Field of Search ............ 73/290 V, 644; 367/908

[56] References Cited

U.S. PATENT DOCUMENTS

| 2,430,013 | 11/1947 | Hansell | 73/644 X |
| 2,625,035 | 1/1953 | Firestone | 73/627 |
| 3,004,424 | 10/1961 | Henry | 73/644 |
| 3,100,885 | 8/1963 | Welkowitz et al. | 367/908 X |
| 4,144,517 | 3/1979 | Baumoel | 73/290 V X |
| 4,284,403 | 8/1981 | Rey | 181/0.5 |

FOREIGN PATENT DOCUMENTS

| 2259049 | 2/1975 | France . |
| 0469018 | 7/1937 | United Kingdom . |
| 2050604 | 1/1981 | United Kingdom . |

Primary Examiner—Daniel M. Yasich
Attorney, Agent, or Firm—Murray, Whisenhunt and Ferguson

[57] ABSTRACT

A parameter such as the depth (d) of a liquid (12) in a tank (10) is measured by use of an ultrasonic transducer (14) outside the tank (10). This is possible by choosing the ultrasonic frequency and the thickness of the tank wall such that a defined relationship is satisfied.

4 Claims, 1 Drawing Figure

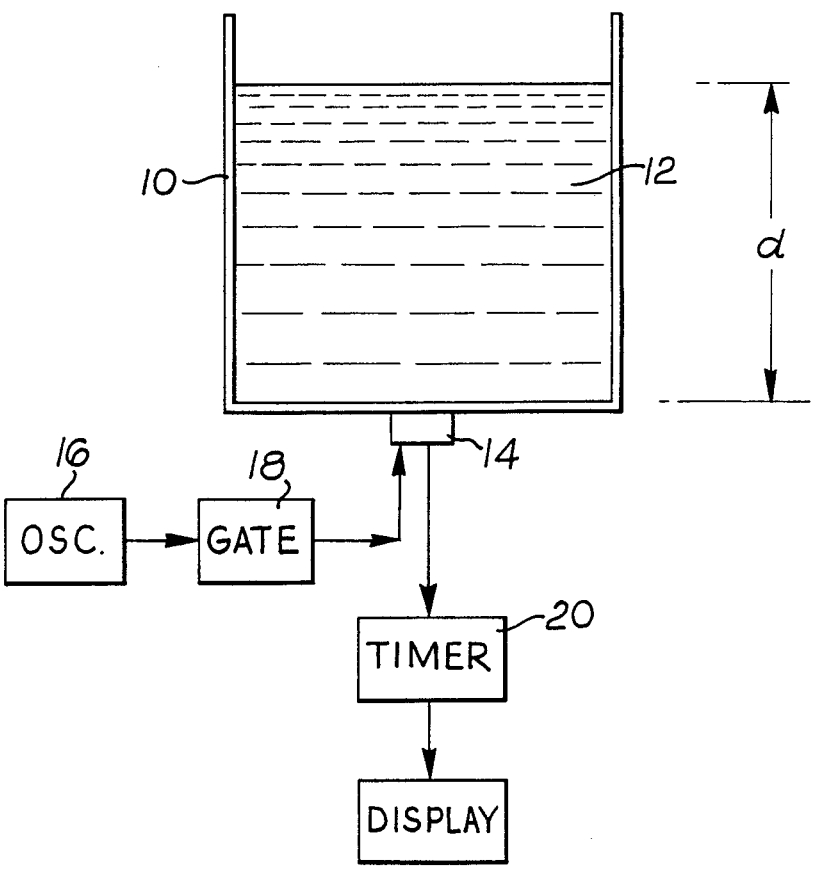

METHOD AND APPARATUS FOR ULTRASONIC MEASUREMENT OF A PHYSICAL PARAMETER

This invention relates to measurement of physical parameters using ultrasonics.

It has hitherto been thought that it is not practicable to measure some parameter, e.g. depth, within a vessel or container by means of an ultrasonic transducer external to the vessel or container because of the reflections and resonance produced by the ultrasonic beam interacting with the vessel or container itself. The present invention provides a means of doing this, with obvious advantages of simplicity, reliability and cost.

The present invention provides apparatus for measuring a physical parameter on one side of a wall from a location on the opposite side of the wall, including an ultrasonic transducer secured to the wall and an oscillator arranged to drive the transducer to emit ultrasonic energy at a given frequency, in which said frequency is such that the thickness of the wall satisfies the relationship:

$$t = K_o \cdot \lambda/4$$

where t is the wall thickness, $K_o$ is an odd number 1,3,5 ..., and $\lambda$ is the wavelength of the ultrasonic energy in the wall material, for the case where the acoustic impedance of the wall is lower than that of the transducer crystal material; or $$t = K_e \cdot \lambda/2$$

where t and $\lambda$ are as defined above and $K_e$ is an even number 0,2,4 ..., for the case where the acoustic impedance of the wall is equal to or higher than that of the transducer crystal material.

From another aspect, the invention resides in a method of measuring a physical parameter on one side of a wall from a location on the opposite side of the wall, comprising abutting an ultrasonic transducer against said opposite side of the wall and driving the transducer at a frequency selected such that the wall thickness satisfies the relationship:

$$t = K_o \cdot \lambda/4$$

where t is the wall thickness, $K_o$ is an odd number 1,3,5 ..., and $\lambda$ is the wavelength of the ultrasonic energy in the wall material, for the case where the acoustic impedance of the wall is lower than that of the transducer crystal material; or $$t = K_e \cdot \lambda/2$$

where t and $\lambda$ are as defined above and $K_e$ is an even number 0,2,4 ..., for the case where the acoustic impedance of the wall is equal to or higher than that of the transducer crystal material.

The same transducer may be used as a receiver, or another transducer may be positioned against the wall as receiver. The measurement of interest is derived by comparing transmitted and received reflected signals, e.g. by timing, by known techniques.

An embodiment of the invention will now be described, by way of example, with reference to the accompanying drawing which is a schematic illustration of the invention used for measuring liquid level in a tank.

An aluminium tank 10 holds a liquid 12 whose depth d is to be monitored. An ultrasonic transducer 14 of any convenient type is secured against the bottom wall of the tank 10. An oscillator 16 operating at a frequency f is connected via gate 18 to the transducer 14 to produce pulses of ultrasonic energy frequency f.

The frequency f is chosen in this case to be such that the wall of the tank 10 forms a quarter-wavelength plate. Thus f is determined by the wall thickness and the sonic velocity for the material of the tank. For example, an aluminium tank wall of 6 mm thickness will require a frequency of 250 kHz.

This choice of frequency avoids any sizeable echo or resonance from the tank 10. The ultrasonic pulses are thus reflected from the liquid surface and detected by the transducer 12, allowing d to be determined by measuring the transit time by timer 20.

The same technique can be used to measure parameters other than depth. For example, the flow speed of a liquid in a pipe could be measured, since the transit time is altered by variations in flow speed.

The above quarter-wavelength relationship is preferred for the case where the acoustic impedance of the wall is lower than that of the transmitter crystal. However, in such case the technique will also operate with three-quarters wavelength and higher orders, as defined in general terms by:

$$t = K_o \cdot \lambda/4$$

where t is the wall thicknss, $K_o$ is an odd number 1,3,5 ..., and $\lambda$ is the wavelength of the ultrasonic energy in the wall material.

If the wall material has an acoustic impedance equal to or higher than that of the transmitter crystal, the wall thickness should be one-half wavelength or a multiple thereof, as defined in general terms by:

$$t = K_e \cdot \lambda/2$$

where t and $\lambda$ are as defned above and $K_e$ is an even number 0,2,4 ....

Lower $K_o$ and $K_e$ are preferable because of a thinner overall "sandwich" between the transducer face and liquid in the tank therefore reducing the amount of a transmitter reverberation which increases the minimum liquid level that can be accurately measured.

The use of $K_e = 0$ is practicable only with low ultrasonic frequencies.

In a modification (not shown) the wall thickness comprises the actual wall of the tank together with an separate plate inserted between the face of the crystal and the wall; this simplifies the transducer construction. For example, the wall thickness may be $\lambda/2$ and the plate $\lambda/4$ thick, giving an effective $t = 3\lambda/4$.

I claim:

1. Apparatus for measuring a variable physical parameter of a material on one side of a wall from a location on the opposite side of the wall, variation of said physical parameter causing a corresponding variation in the transit time of an ultrasonic pulse through said material, said apparatus comprising
    an ultrasonic transducer secured to said wall;
    an oscillator arranged to drive the transducer to emit ultrasonic energy at a given frequency, in which said frequency is such that the relationship $$t = K_o \lambda / 4$$

is satisfied where t is wall thickness, $K_o$ is an odd number 1, 3, 5 ..., and $\lambda$ is the wavelength of the ultrasonic energy in the wall, for the case where the acoustic impedance of the wall is lower than that of the transducer material, or $$t = K_e \cdot \lambda / 2$$

where t and $\lambda$ are as defined above and $K_e$ is an even number 0, 2, 4 ..., for the case where the acoustic impedance of the wall is equal to or higher than that of the transducer material; and timing means coupled to said transducer and arranged to measure the time interval between the transmission of a signal and the receipt of a reflected signal.

2. Apparatus according to claim 1, wherein said wall is the wall of a tank and the physical parameter to be measured is the depth of a liquid in the tank.

3. Apparatus according to claim 1, wherein the thickness t comprises the thickness of a wall member extending beyond the transducer together with the thickness of a separate plate positioned between the transducer and said wall member.

4. A method of measuring a variable physical parameter of a material on one side of a wall from a location on the opposite side of the wall, variation of said physical parameter causing a corresponding variation in the transit time of an ultrasonic pulse through said material, said method comprising abutting an ultrasonic transducer against said opposite side of said wall;

driving the transducer to emit ultrasonic energy at a given frequency, said frequency being such that the relationship $$t = K_o \cdot \lambda / 4$$

is satisfied where t is wall thickness, $K_o$ is an odd number 1, 3, 5 ..., and $\lambda$ is the wavelength of the ultrasonic energy in the wall, for the case where the acoustic impedance of the wall is lower than that of the transducer material, or $$t = K_e \cdot \lambda / 2$$

where t and $\lambda$ are as defined above and $K_e$ is an even number 0, 2, 4 ..., for the case where the acoustic impedance of the wall is equal to or higher than that of the transducer material; and measuring the time interval between the transmission of a signal and the receipt of a reflected signal.

* * * * *